United States Patent Office 3,356,574
Patented Dec. 5, 1967

3,356,574
**VACCINE FOR COMBATING *SALMONELLA DUBLIN* INFECTION**
Herbert Williams Smith, Stock, Essex, England, assignor to National Research Development Corporation, London, England, a corporation of Great Britain
No Drawing. Filed Dec. 2, 1964, Ser. No. 415,472
Claims priority, application Great Britain, Dec. 17, 1963, 49,890/63
5 Claims. (Cl. 167—78)

ABSTRACT OF THE DISCLOSURE

A vaccine for combating *Salmonella dublin* infection is prepared using the attenuated variant of *Salmonella dublin* having the ATCC deposit number 15480. The variant, obtained by repeatedly selecting and growing rough colonies of *Salmonella dublin* is stable, non-pathogenic in calves and can be freeze-dried for storage without modification of its properties. It is used as live vaccine in an aqueous supension.

---

This invention relates to vaccines and more particularly to a vaccine for combating *Salmonella dublin* infection in calves. *Salmonella dublin* infection is a bacterial infection which affects calves usually when they are about one to four months old. The disease may spread rapidly through a herd and is often fatal or, in cases where the animal survives, causes such emaciation that the animal must be destroyed. It has been the practice in the past to treat outbreaks of the disease with antibiotics but this is not always satisfactory and hence there is a need for some prophylactic measure against *Salmonella dublin* infection.

*Salmonella dublin*, in common with many other microorganisms, is known to exist in rough and smooth forms and the search for suitable strains of organisms for vaccine purposes has concentrated on the rough forms. However, a very large number of rough colonies which have been selected from the bacterial growths have been found to be unsuitable. Rough colonies have been frequently rejected for vaccine purposes because in some cases the rough forms are too virulent and cause unacceptable disease symptoms in the animal or because they do not provoke a sufficient immune response or because they are insufficiently stable and revert in vivo to more virulent forms.

Two distinct selection processes have been used in attempts to obtain rough strains of *Salmonella dublin* suitable for the production of vaccines. These are visual selection and phage selection and the latter method has led after much experimentation to the isolation of a rough form which is suitable for vaccine production. This suitability is based on an acceptable combination of apathogenicity for calves, immunogenicity and stability. This rough form, originally designated HWS 51, has been deposited in the American Type Culture Collection in Maryland, U.S.A., and given the deposit number ATCC 15480.

The present invention provides a vaccine composition comprising the attenuated strain of *Salmonella dublin* having the ATCC deposit number 15480 and a pharmaceutically acceptable diluent. The composition is preferably in the form of an injectable vaccine which may be formulated using freeze dried organisms. The invention accordingly includes a freeze dried culture of the Salmonella organism ATCC 15480.

An injectable vaccine may be made up from the free dried organisms using an injectable diluent to provide a vaccine composition containing $10^8$ to $10^9$ viable bacteria per ml. of vaccine. A vaccine composition containing a bacterial concentration of this order has been found convenient for the vaccination of calves where a single dose of 1–10 mls. can be used. Such compositions may be prepared in a unit dosage form where each unit contains $10^8$ to $10^9$ viable bacteria.

The Salmonella vaccine may be made up using any of the injectable diluents in common use in the veterinary field such as sterile, distilled water, saline or phosphate buffer solutions. Such formulations are conveniently prepared using the freeze dried bacteria, but it is not essential to use the organisms in this condition. It is possible to harvest the organisms from an ordinary culture e.g. nutrient agar culture and to re-suspend it in diluents such as those mentioned above. It is also possible to utilise a broth culture of the organisms directly as a vaccine provided the obvious precautions regarding sterility etc. are taken and very satisfactory results have been obtained using such vaccines in the field.

Although positive results have been obtained by oral administration of the vaccine in mice the preferred method of application is by parenteral administration and subcutaneous injection has been found particularly valuable for combating *Salmonella dublin* infection in calves.

The following example illustrates the invention.

Example

A culture of *Salmonella dublin*, isolated from the organs of a calf which had died from *Salmonella dublin* infection, is inoculated into 20 mls. of a sterile nutrient broth and the organism grown at 37° C. for 24 hours. The broth is made from a proprietary concentrate (Oxoid No. 1, formula CM 67) and contains "Lab Lemco" beef extract 1 g./l. yeast extract (Oxoid L20) 2 g./l., peptone (Oxoid L37) 5 g./l. and sodium chloride 5 g./l. The pH is approximately 7.4. The nutrient broth culture was then spread over a plate of nutrient agar containing the same nutrients as the broth together with 15 g./l. agar and when it was dry a drop of Salmonella anti-O phage No. 1 suspension (Felix and Callow, British Medical Journal, 1943, 2, 127) placed on it. The plate was then incubated at 37° C. for 24 hours after which time complete lysis had occurred in the area in which the phage had been applied. Several phage resistant colonies were found to be growing in this area however, and these were shown to be rough by the slide acraflavine test (Braun and Bonestell, Amer. J. Vet. Res. 1948, 8, 386).

One of these rough colonies was selected and further purified by direct plating five times on beef extract/yeast extract/peptone/sodium chloride agar, a single colony being selected on each occasion for further culture. The organisms selected from the fifth agar plate are the stable organisms deposited at the ATCC under the deposit number 15480. These organisms have also been designated for laboratory purposes at the Animal Health Trust Farm Livestock Research Centre as HWS 51. Its suitability for vaccine purposes is determined by an assessment of the attenuation, stability and immunogenicity on mice and calves.

The organisms from the fifth agar plate have been freeze dried by culturing on an agar slope for 24 hours at 37° C., suspending a sample of the bacteria in *Mist. desiccans* (glucose and horse serum) to give a thick suspension and drying the suspension in a commercial freeze drying machine. ATCC 15480 may also be preserved by culturing on a Dorset egg medium for 24 hours at 37° C. and thereafter maintaining the culture at 5° C.

Freeze dried organisms may be suspended in sterile distilled water to give an injectable vaccine. The organisms from the fifth plate have also been cultivated in the sterile nutrient broth mentioned above at 37° and the 24 hours nutrient broth containing approximately $5 \times 10^8$ viable bacteria per ml. used for direct vaccination of calves as described below.

An 18 hour broth culture of ATCC 15480 consists of a fine powdery deposit and a turbid supernatant fluid. A suspension of the organism in normal saline is stable and agglutinates immediately and completely when submitted to the slide acraflavine test.

In this example only those process steps resulting in the production of the finally selected vaccine strain are mentioned. It will be appreciated however that a large number of other rough forms obtained by these and similar process steps have been tested but were all rejected as being unsuitable for vaccine purposes.

The vaccines produced in accordance with the methods described in the example have been subjected to field trials in calves which were vaccinated and the efficiency of the vaccine tested by artificial challenge with the virulent organism. The tests were carried out on three weeks old male Ayrshire calves which had been weaned when approximately one week old and then fed solely on a proprietary liquid milk substitute twice daily. The calves were vaccinated with a single subcutaneous 5 ml. injection of the 24 hour nutrient broth vaccine containing approximately $5 \times 10^8$ viable bacteria per ml. described in the example. The vaccine was then challenged three weeks after vaccination by oral administration of the virulent organism.

be used to combat *Salmonella dublin* infection in calves but that in addition mice tests indicate that the *Salmonella dublin* vaccine containing ATCC 15480 can sometimes be used successfully as a prophylactic measure against related Salmonella infections such as *Salmonella typhimurium*.

A live *Salmonella gallinarum* vaccine containing an attenuated smooth form of the organism and designated HWS 9S at the Animal Health Trust Farm Livestock Research Centre laboratories was prepared by repeated culture of a virulent organism in a synthetic medium. 5 ml. portions of the culture containing approximately $5 \times 10^8$ viable bacteria per ml. were used to vaccinate the Ayrshire calves in exactly the same way as described above for the *Salmonella dublin* vaccine. Two calves were also injected with a mixed vaccine containing 2.5 mls. of the *Salmonella dublin* vaccine and 2.5 mls. of the *Salmonella gallinarum* vaccine and detailed results of these tests are shown in the table below which also includes results of similar tests carried out with the same vaccines on Friesian calves. These calves were male Fresians reared intensively for beef production, vaccinated when three weeks old and maintained on a diet of solid concentrated food for a week before challenge when approximately six weeks old. The Friesians were observed for approximately 14 days after challenge by which time the survivors showed no ill effect from vaccination or challenge.

| Calves | Vaccine | Number of Calves Vaccinated | Cumulative Mortality on the following days after challenge | | | | | | Number of Survivors |
|---|---|---|---|---|---|---|---|---|---|
| | | | 2 | 3 | 4 | 5 | 6 | 7 | |
| Ayrshires | ATCC 15480 | 5 | 0 | 0 | 0 | 0 | 1 | 1 | 4 |
| | ATCC 15480 and HWS 9S | 2 | 0 | 0 | 0 | 0 | 0 | 0 | 2 |
| | HWS 9S | 7 | 0 | 0 | 0 | 2 | 4 | 4 | 3 |
| | None | 14 | 4 | 10 | 13 | 13 | 13 | 14 | 0 |
| | | | 7 | 8 | 9 | 10 | 11 | 11+ | |
| Friesians | ATCC 15480 | 10 | 0 | 0 | 0 | 0 | 0 | 0 | 10 |
| | HWS 9S | 10 | 1 | 1 | 2 | 2 | 2 | 3 | 7 |
| | None | 10 | 0 | 1 | 2 | 3 | 5 | 6 | 4 |

The body temperature, appetite and general appearance of the calves was recorded before and after vaccination and before and after challenge and the animals examined for lesions. The liver and frequently other organs from calves that died were examined bacteriologically to confirm that they had died from the Salmonella organism with which they had been challenged. The calves were examined for 21 days after challenge at which time the survivors had recovered almost completely. The detailed results of these tests are shown in the table below.

In the course of the investigation into production of resistance to *Salmonella dublin* infection it has been found that a useful degree of immunity can be produced if the calf is vaccinated with a live attenuated strain of *Salmonella gallinarum*. The vaccine used for this purpose is preferably one which contains smooth forms of the organism. Tests in calves have shown that the degree of immunity to *Salmonella dublin* infection produced by a *Salmonella gallinarum* vaccine is not as great as the immunity produced by the *Salmonella dublin* vaccine described above, but the *Salmonella gallinarum* vaccine has a great advantage in that *Salmonella gallinarum* is not a pathogen in calves and hence there is no risk of disease symptoms being caused by the vaccination. The present invention therefore includes a process for combating *Salmonella dublin* infection in calves by parenteral administration of a live *Salmonella gallinarum* vaccine.

In the course of this investigation it has also been found that not only can *Salmonella gallinarum* vaccines

I claim:

1. A freeze dried culture of the attenuated strain of *Salmonella dublin* having the ATCC reference number 15480.

2. A vaccine composition comprising the attenuated strain of *Salmonella dublin* having the ATCC reference number 15480 and a pharmaceutically acceptable diluent.

3. An injectable composition in unit dosage form comprising the attenuated strain of *Salmonella dublin* having the ATCC reference number 15480 and a pharmaceutically acceptable diluent, the number of variable bacteria in the unit being from $10^8$ to $10^9$.

4. A method of combating *Salmonella dublin* infection in calves which includes administering by injection to the animal a vaccine comprising the attenuated strain of *Salmonella dublin* having the ATCC reference number 15480 and a pharmaceutically acceptable diluent.

5. A method of combating *Salmonella dublin* infection in calves which includes administering by injection to the animal a vaccine comprising an attenuated live strain of *Salmonella gallinarum* and a pharmaceutically acceptable diluent.

No references cited.

ELBERT L. ROBERTS, *Primary Examiner.*

LEWIS GOTTS, *Examiner.*

R. HUFF, *Assistant Examiner.*